United States Patent [19]

Chen et al.

[11] Patent Number: 5,801,623
[45] Date of Patent: Sep. 1, 1998

[54] METHOD OF DETECTING A LAMP OUTAGE CONDITION IN A VEHICLE FLASHER SYSTEM

[75] Inventors: Bor-Dong Chen, Dearborn; William Gary Majorana, Plymouth; Thomas E. Klauke, Dearborn, all of Mich.

[73] Assignee: Ford Motor Company, Dearborn, Mich.

[21] Appl. No.: 885,894

[22] Filed: Jun. 30, 1997

[51] Int. Cl.[6] ............................................. B60Q 11/00
[52] U.S. Cl. .......................... 340/458; 340/458; 340/641; 340/642; 340/661
[58] Field of Search ........................... 340/458, 459, 340/468, 471, 660, 661, 662, 663, 664, 641, 642; 307/10.8; 315/82, 130, 149, 200 A

[56] References Cited

U.S. PATENT DOCUMENTS

| | | | |
|---|---|---|---|
| 4,096,470 | 6/1978 | Kimmelman | 340/458 |
| 4,173,750 | 11/1979 | Riba | 340/458 |
| 4,348,655 | 9/1982 | Goertler et al. | 340/458 |
| 4,349,810 | 9/1982 | Kugo et al. | 340/458 |
| 4,667,187 | 5/1987 | Volk et al. | 340/641 |
| 4,862,142 | 8/1989 | Knight | 340/522 |
| 4,910,496 | 3/1990 | Hatanaka et al. | 340/458 |
| 5,057,814 | 10/1991 | Onan et al. | 340/458 |
| 5,072,210 | 12/1991 | Kimmelman | 340/458 |
| 5,075,669 | 12/1991 | Nakadozono et al. | 340/458 |
| 5,173,685 | 12/1992 | Nimmo | 340/642 |
| 5,235,317 | 8/1993 | Sutterlin et al. | 340/458 |
| 5,331,314 | 7/1994 | Koch | 340/661 |
| 5,515,028 | 5/1996 | Dittmar | 340/458 |
| 5,578,998 | 11/1996 | Kasprowicz | 340/642 |

*Primary Examiner*—Jeffery A. Hofsass
*Assistant Examiner*—Toan N. Pham
*Attorney, Agent, or Firm*—Paul K. Godwin; Roger L. May

[57] ABSTRACT

An adaptive method of detecting a lamp outage condition is implemented in a vehicle flasher system including a plurality of lamps. The method includes the steps of: a) initializing an adaptive flasher current variable when the vehicle flasher system is powered on; b) monitoring the vehicle flasher system to detect a driver flasher signal request; c) measuring current output from the plurality of lamps in the vehicle flasher system; d) determining whether the level of measured current is indicative of a lamp outage condition by comparing the measured current to the adaptive flasher current variable; e) setting the adaptive flasher current variable equal to the measured current if the measured current falls within a predetermined learning range, thereby compensating for resistance changes in the flasher system over time to allow lamp outage detection; and f) returning to step b).

10 Claims, 6 Drawing Sheets

5,801,623

METHOD OF DETECTING A LAMP OUTAGE CONDITION IN A VEHICLE FLASHER SYSTEM

TECHNICAL FIELD

The present invention relates to a method of detecting a lamp outage condition in a vehicle flasher system and, more particularly, to an adaptive scheme for detecting the lamp outage in a flasher system including a plurality of lamps.

BACKGROUND OF THE INVENTION

Some vehicle flasher systems include a microcontroller in electrical communication with the various flasher lamps on the vehicle for determining a lamp outage condition and for facilitating notification of the driver of the outage condition, for example, by increasing the flasher frequency. The lamp outage condition may be detected by monitoring the current output of the array of flashers.

However, determining a lamp outage condition by monitoring current output from an array of flasher lamps may be problematic because the measured current may change over time as a result of resistance changes in the flasher system, which may result in faulty lamp outage detection readings. For example, electrical interconnects often become more resistive over time, and lamp filament resistances change over time. Also, bulb replacement may result in resistance variation in the system, which could lead to significant variation in output current, which causes difficulty in lamp outage detection.

Some current vehicle designs require two or more flasher lamps at a particular flasher location on the vehicle. This can further enhance the difficulty described above with respect to changes in resistance over time because a stack-up effect of resistance changes may accumulate to dramatically change the output current of the flasher system, which makes current monitoring unreliable over a period of time for detecting lamp outage.

Accordingly, it is desirable to provide a method of detecting a lamp outage condition which compensates for vehicle flasher system resistance changes over time and enables the use of a plurality of flasher lamps at a particular flasher location on a vehicle.

DISCLOSURE OF THE INVENTION

The present invention overcomes the above-referenced shortcomings of prior art lamp outage detection schemes by providing an adaptive flasher lamp outage detection scheme in which an adaptive flasher current variable is periodically updated based upon the measured flasher output current for adapting the outage detection scheme in response to system resistance changes over time.

More particularly, the present invention provides a method of detecting a lamp outage condition in a vehicle flasher system including a plurality of lamps. The method includes the following steps:

a) initializing an adaptive flasher current variable when the vehicle flasher system is powered on;

b) monitoring the vehicle flasher system to detect a driver flasher signal request;

c) measuring current output from the plurality of lamps in the vehicle flasher system;

d) determining whether the level of measured current is indicative of a lamp outage condition by comparing the measured current to the adaptive flasher current variable;

e) setting the adaptive flasher current variable equal to the measured current if the measured current falls within a predetermined learning range, thereby compensating for resistance changes in the flasher system over time to allow lamp outage detection; and f) returning to step b).

Accordingly, an object of the present invention is to provide an adaptive learning method for detecting a lamp outage condition in a vehicle flasher system in which output current from the flashers is measured and used for adjusting an adaptive flasher current variable periodically in order to compensate for system resistance changes over time by comparing the measured flasher output current to the updated adaptive flasher current variable for detecting lamp outage.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
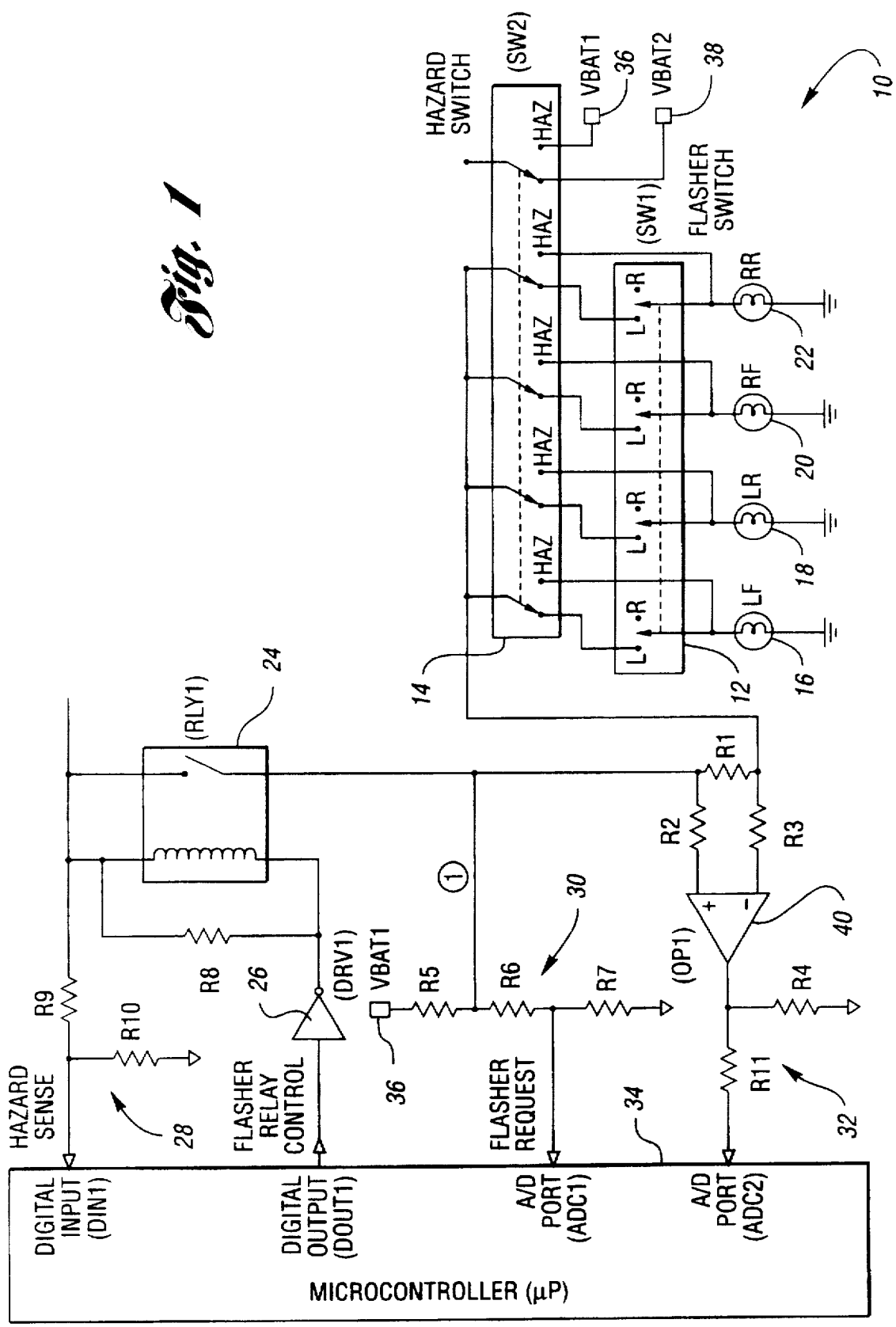
FIG. 1 is a schematic illustration of a flasher relay control and lamp outage detection system in accordance with the present invention.

As shown in FIG. 1, the flasher relay control and lamp outage detection system 10 of the present invention consists of a flasher switch 12 (SW1), a hazard switch 14 (SW2), the left front turn lamp(s) 16 (LF), the left rear turn lamp(s) 18 (LR), the right front turn lamp(s) 20 (RF), the right rear turn lamp(s) 22 (RR), a flasher relay 24 (RLY1), a flasher relay inverter/driver 26 (DRV1), a hazard sense circuitry 28, a flasher request detection circuitry 30, a flasher current or lamp outage sense circuitry 32, a microcontroller 34 (uP), and two flasher power sources 36,38 (VBAT1, VBAT2).

The hazard sense circuitry 28 is a voltage divider consisting of two resistors, i.e. R9 and R10. The voltage across R10 is used as the HAZARD SENSE signal and is sent to a digital input port (DIN1) of the microcontroller. The flasher request detection circuitry 30 is mainly a voltage divider which consists of three resistors, i.e., R5, R6, and R7. The voltage across R7 is used as the FLASHER REQUEST signal and is sent to an analog-to-digital port (ADC1) of the microcontroller 34. The flasher current and/or lamp outage sense circuitry 32 consists of five digital resistors, i.e. R1, R2, R3, R4, R11 and one operational amplifier 40 OP1. The output of OP1 is connected to an analog-to-digital port (ADC2) through resistor R11. The signal at ADC2 is named FLASHER CURRENT. The power source VBAT1 is always connected to the battery. The power source VBAT2 has voltage only when the ignition key is ON. The flasher switch (SW1) and the hazard switch (SW2), as shown in FIG. 1, are in the OFF position. The flasher switch is used to flash the right or left turn signal lamps 16, 18, 20, 22 when the ignition key is ON; while the hazard switch 14 is used to flash all the turn signal lamps at any time.

Still referring to FIG. 1, the values for R5, R6 and R7 are carefully selected so that when both the flasher switch 12 (SW1) and the hazard switch 14 (SW2) are OFF, the FLASHER REQUEST voltage will be greater than a predetermined threshold. When SW1 12 is switched to the left or to the right, an additional current flow path (VBAT1, R5, R1, SW2, SW1, LF/LR or RF/RR, and ground) is formed, causing the voltage at node 1 to drop, and thus the FLASHER REQUEST voltage to fall below the predetermined threshold. In this case, when VBAT2 has power, causing the HAZARD SENSE voltage to be HIGH, the control algorithm to be described later will start flashing the turn signal lamps by turning on and off the flasher relay RLY1 at a predetermined rate through the FLASHER RELAY CONTROL at one digital output port (DOUT1) of the microcontroller 34 and the inverter/driver 26 DRV1. When the metal contact of the relay 24 is made, the turn signal lamps will be turned on through the current sense resistor R1. In this case, the control algorithm will check the FLASHER CURRENT to determine whether a lamp outage condition exists. If a lamp outage condition is detected, the flasher rate will be changed to a different, usually higher, rate to notify the driver of a lamp outage condition. This flasher relay operation continues until the flasher switch 12 (SW1) is detected to be OFF or the HAZARD SENSE voltage to be low. Similarly, at any time, when the hazard switch 14 is switched to HAZ position, the HAZARD SENSE voltage will be high and the FLASHER REQUEST voltage will be lower than the threshold, causing the flasher relay to start flashing continuously until the hazard switch is turned OFF.

Due to manufacturing variations and the gradual changes in the resistance of the lamps, wiring, and the connectors as the vehicle ages, the flasher current will not be maintained in a very narrow range in a vehicle's lifetime. Therefore, to make the control algorithm effective for all vehicles in the allowed tolerance range and throughout their life cycles, the control algorithm adopts an adaptive strategy to learn the system's flasher current under the normal operation condition and uses it to determine the lamp outage condition. The details of the control algorithm will be described in the following paragraphs.

Figure 2:
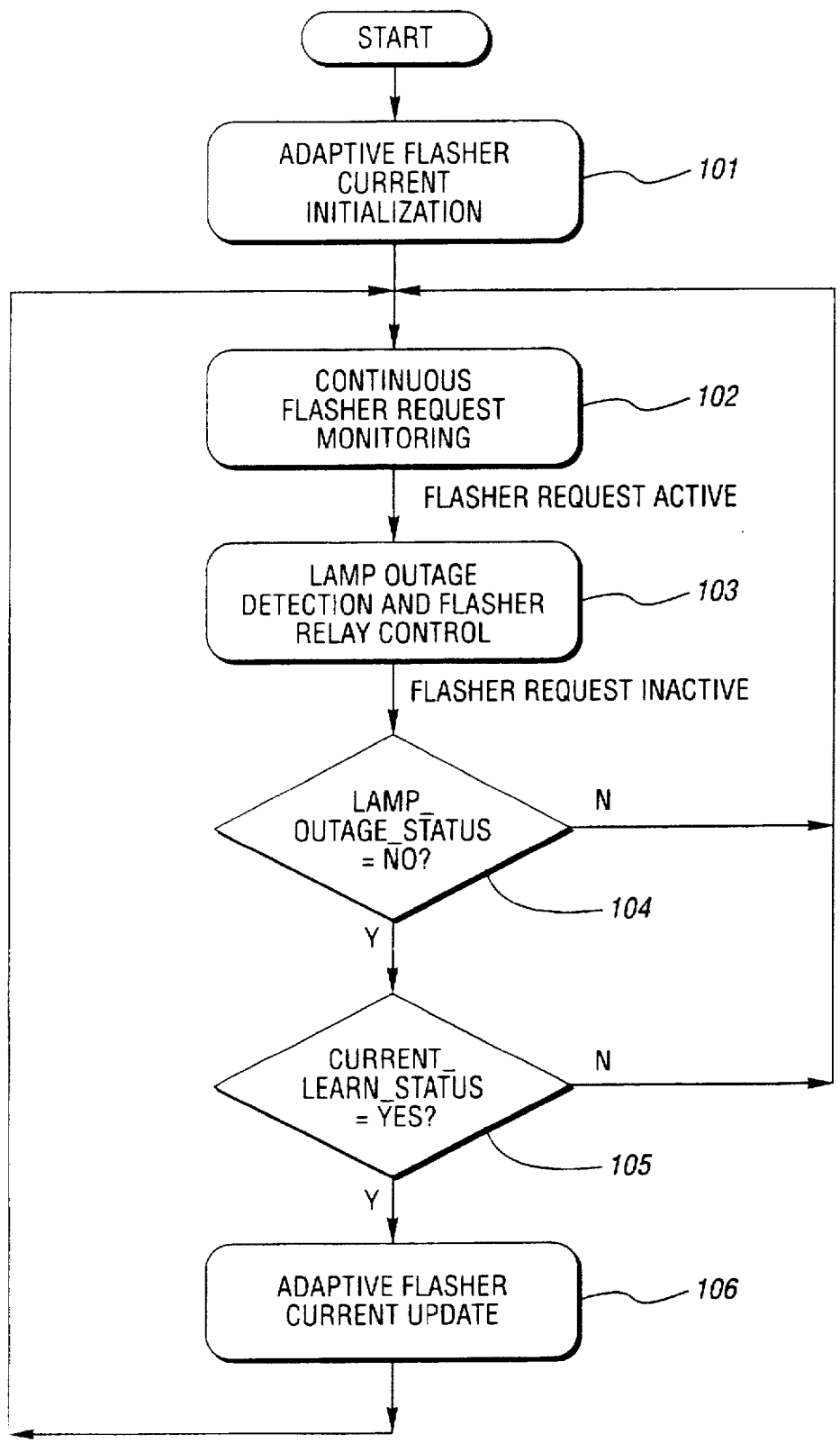
FIG. 2 is a flowchart illustrating a method of detecting a lamp outage condition in accordance with the present invention.
Figure 3:
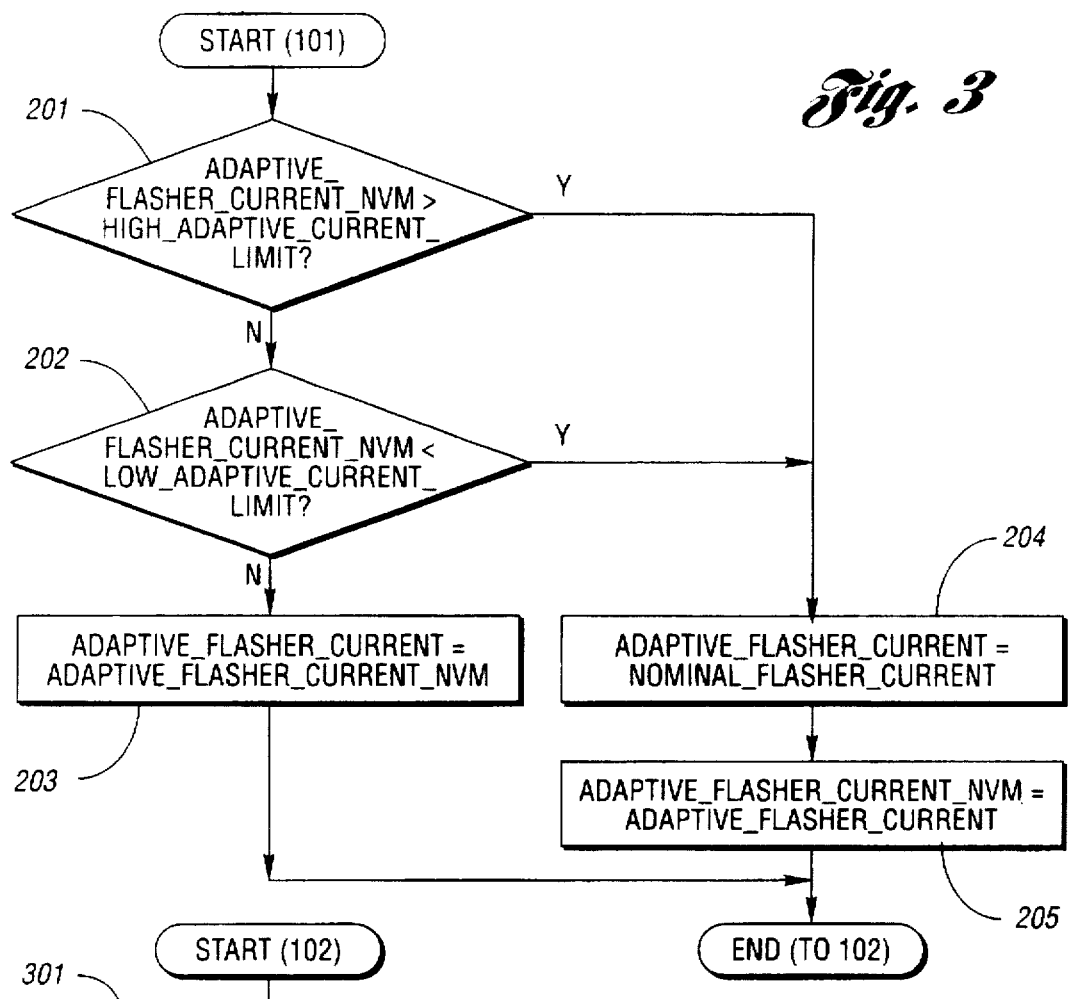
FIG. 3 is a flowchart illustrating an adaptive flasher current initialization process in accordance with the present invention.
Figure 4:
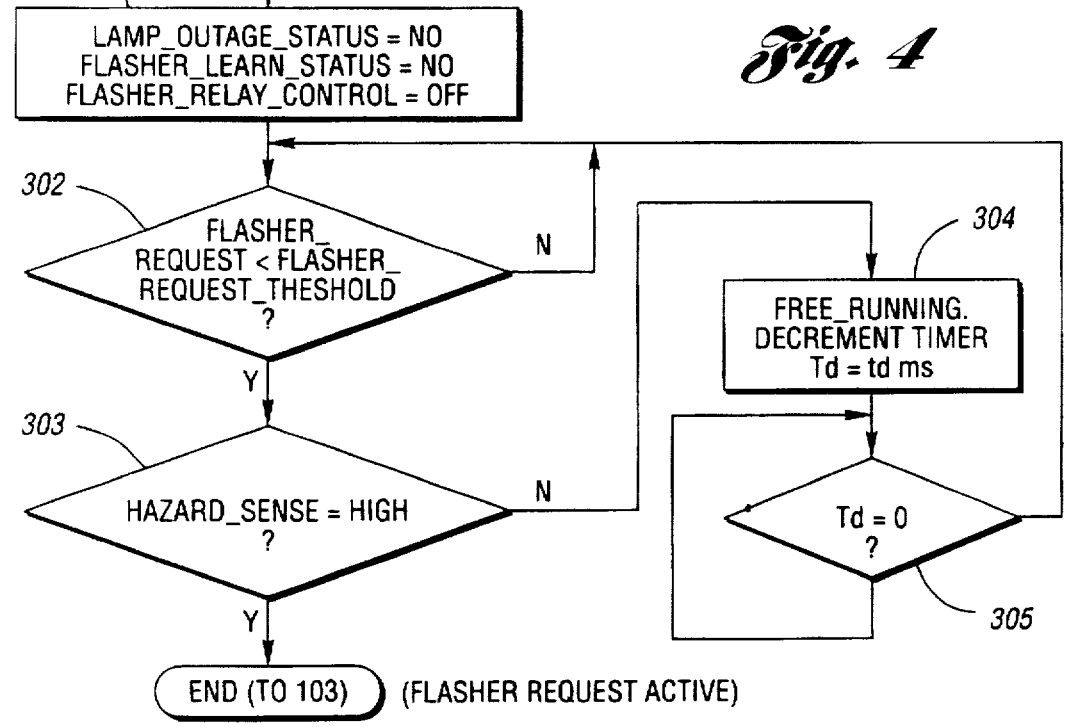
FIG. 4 is a flowchart illustrating continuous flasher request monitoring in accordance with the present invention.

FIG. 2 shows the flowchart for the adaptive flasher lamp outage detection method proposed in this invention. Upon power up of the system, step 101, the ADAPTIVE FLASHER CURRENT INITIALIZATION process will be executed to initialize the adaptive flasher current. Then, the process proceeds to step 102 to monitor the FLASHER REQUEST signal continuously. When the FLASHER REQUEST signal is detected to be active, the process proceeds to step 103 to control the flasher relay operation and detect a lamp outage condition. If no amp outage condition is detected, the relay flashes at a regular rate; otherwise, the relay flashes at a faster rate. The process continues until the FLASHER REQUEST signal is detected to be inactive. In this case, the flasher relay is turned off and the process proceeds to step 104 to check the lamp outage status. If a lamp outage condition is detected, the LAMP_OUTAGE_STATUS flag will be set to YES in step 103, then the process proceeds to step 102 to continuously monitor the FLASHER REQUEST signal. If a lamp outage condition is not detected, i.e. the LAMP_OUTAGE_STATUS is set to NO, the process proceeds to step 105 to check if the flasher current learning status flag is set. If CURRENT_LEARN_STATUS flag is set to NO, then the process proceeds to step 102; otherwise, the process proceeds to step 106 to update the adaptive flasher current before it proceeds back to step 102. The details of each step are shown in FIG. 3 to FIG. 6. FIG. 3 illustrates the adaptive flasher current initialization process. FIG. 4 shows the flasher request signal monitoring process. FIG. 5 shows the lamp outage detection and the flasher relay control process. FIG. 6 shows the adaptive flasher current learning or update process.

Referring to FIG. 3, upon power up, the adaptive flasher current stored in the non-volatile memory (NVM) is examined. The adaptive flasher current stored in NVM is called ADAPTIVE_FLASHER_CURRENT_NVM; while the adaptive flasher current stored in the random-access memory (RAM) is called ADAPTIVE_FLASHER_CURRENT. The NVM and RAM, not shown in FIG. 1, are located in the microcontroller. The contents of the NVM will not be lost when the power is removed; while, the contents of the RAM will be lost when the power is removed. An example of the NVM device is the electrically erasable programmable read only memory (EEPROM). If this system has never been powered up, the contents of the NVM are empty and both the adaptive flasher current, i.e. ADAPTIVE_FLASHER_CURRENT and ADAPTIVE_FLASHER_CURRENT_NVM will be initialized to a predetermined nominal value, NOMINAL_FLASHER_CURRENT. On the other hand, when the battery of a used vehicle is replaced, most likely the value of the ADAPTIVE_FLASHER_CURRENT_NVM is less than a predetermined high limit, HIGH_ADAPTIVE_CURRENT_LIMIT, but is greater than a predetermined low limit, LOW_ADAPTIVE_CURRENT_LIMIT. In this case, the ADAPTIVE_FLASHER_CURRENT is initialized with the value stored in the NVM, i.e., ADAPTIVE_FLASHER_CURRENT_NVM. The value of ADAPTIVE_FLASHER_CURRENT will be used in step 103 as the reference in determining whether a lamp outage condition exists. After the initialization of the adaptive flasher current, the process proceeds to step 102.

Referring to FIG. 4, in the beginning of the continuous flasher request monitoring process, step 301, two flags, LAMP_OUTAGE_STATUS and FLASHER_LEARN_STATUS are set to NO and the flasher relay is turned off, i.e., the FLASHER_RELAY_CONTROL is set to OFF. Then, in step 302, the FLASHER REQUEST signal is checked to see if it is less than a predetermined threshold, FLASHER_REQUEST_THRESHOLD. If it is less than the threshold, the process proceeds to step 303 to check if the HAZARD SENSE signal is active, i.e., HAZARD_SENSE=HIGH. If it is, the FLASHER REQUEST signal is detected to be active, and thus, the process proceeds to step 103. Otherwise, if the FLASHER REQUEST signal is detected to be high or the HAZARD SENSE signal is detected to be low, the process proceeds to step 304 to set up a free-running decrement timer, $T_d$, which resides in the microcontroller and is not shown in FIG. 1) to $t_{delay}$ milliseconds and then proceeds to step 305 to wait until the timer times out before it performs another check on the FLASHER REQUEST signal. The process continues until the FLASHER REQUEST signal is detected to be active. Then the process proceeds to step 103.

Figure 5A:
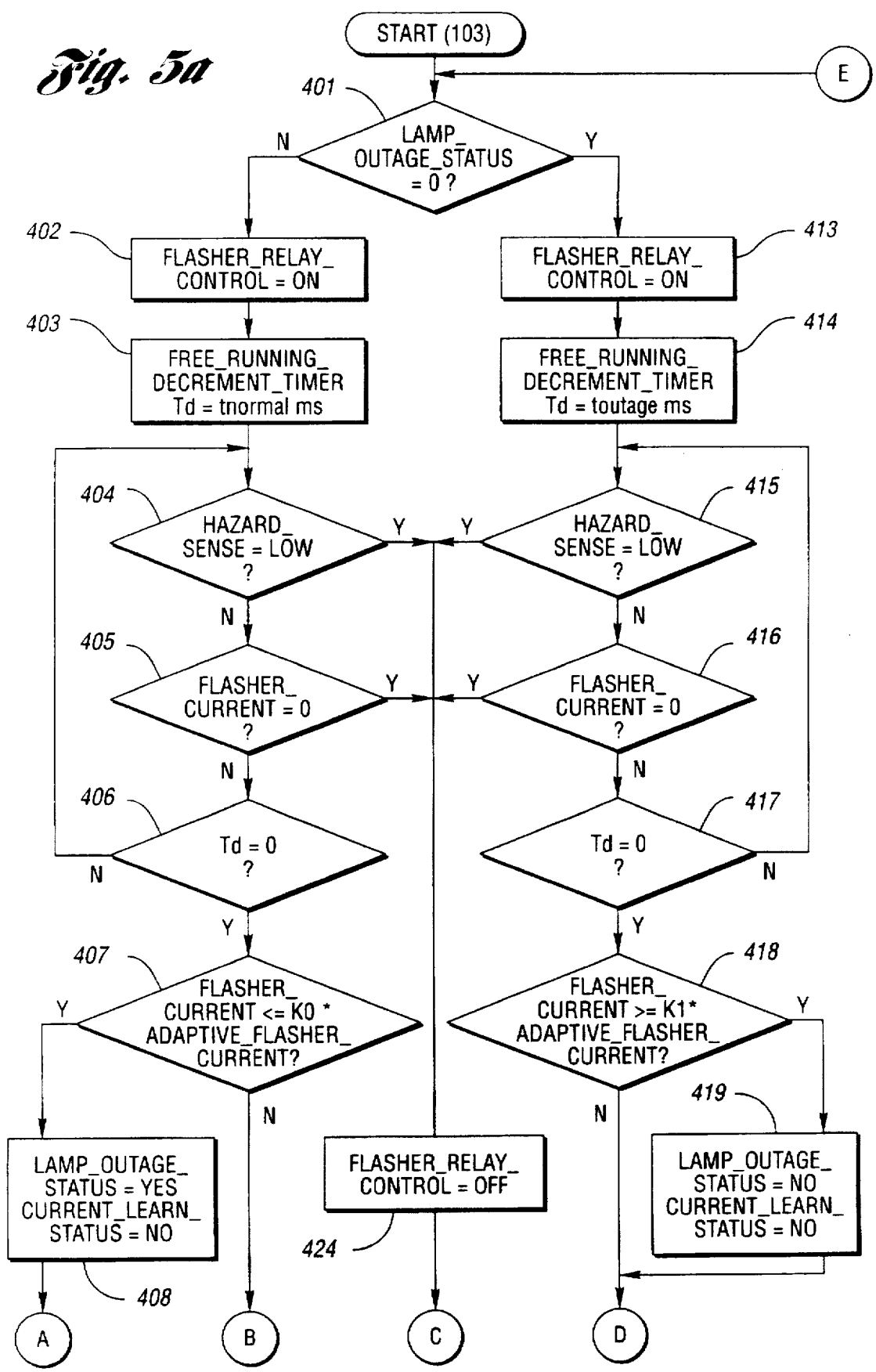
FIGS. 5a and 5b show a flowchart illustrating lamp outage detection and flasher relay control in accordance with the present invention.
Figure 5B:
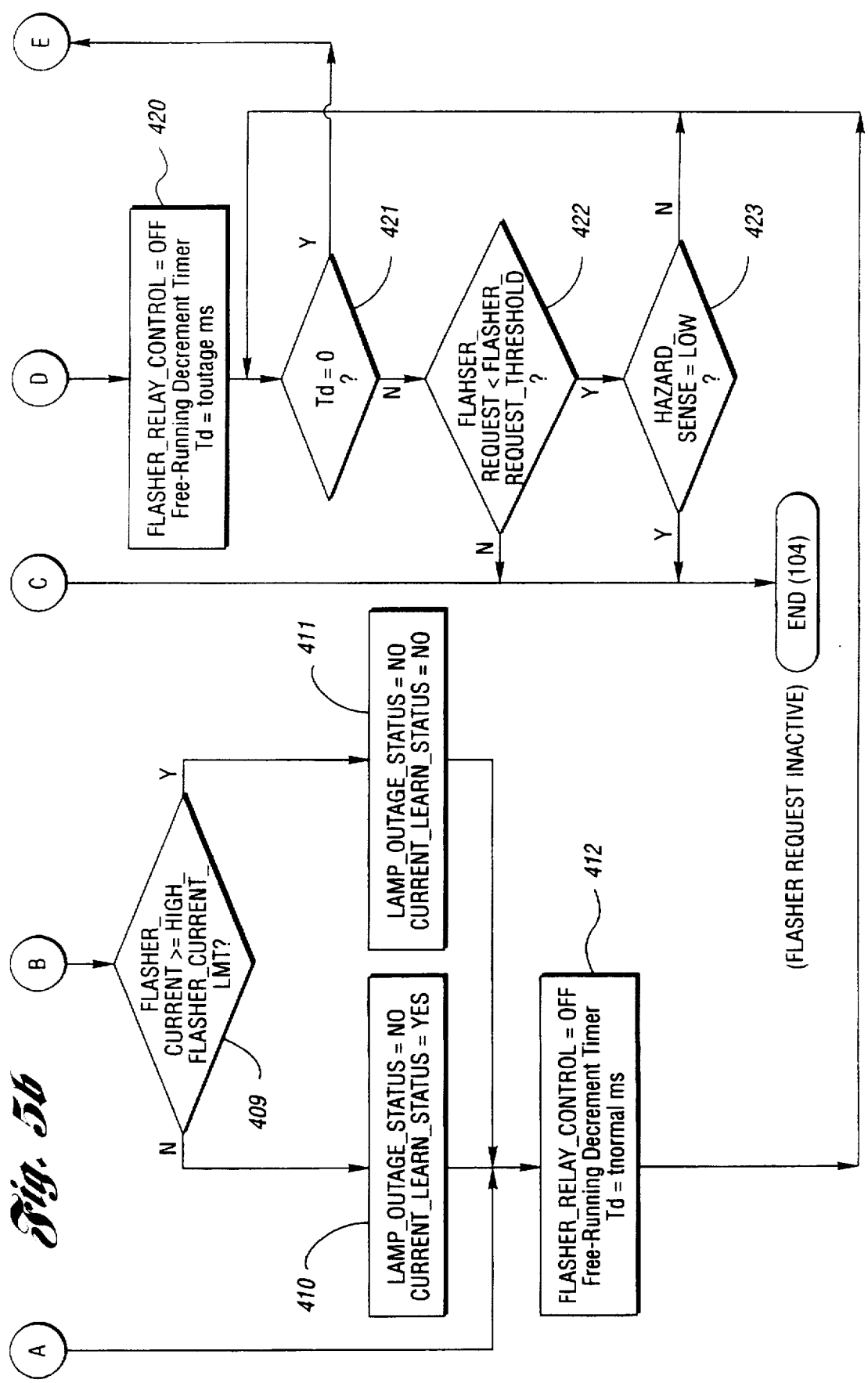
Figure 6:
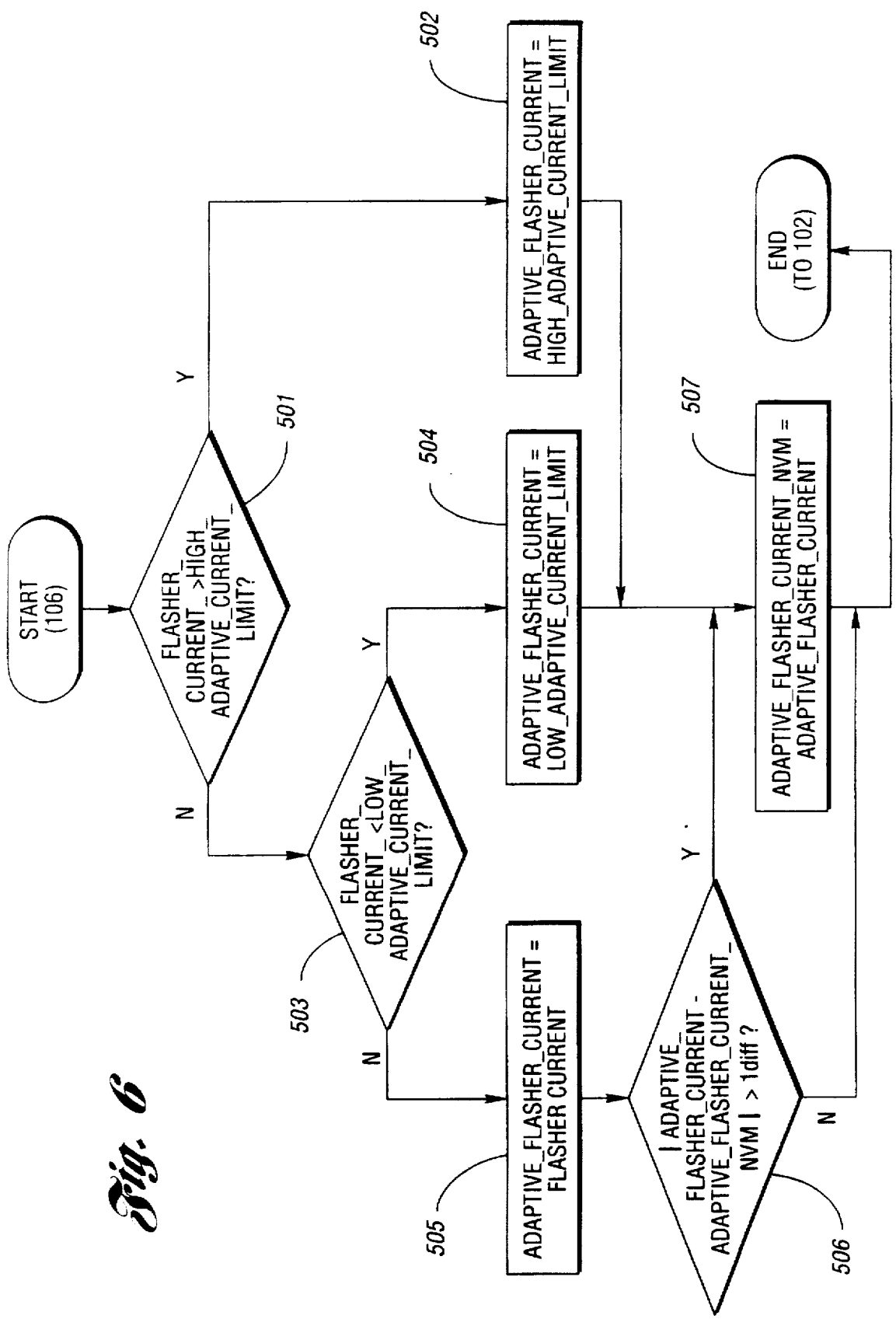
FIG. 6 is a flowchart illustrating adaptive flasher current updating in accordance with the present invention.

FIGS. 5a and 5b shows the process flow of the lamp outage detection and the flasher relay control. In step 401, the lamp outage status flag, i.e., LAMP_OUTAGE_

STATUS, is checked. If LAMPOUT_OUTAGE_STATUS is set to NO, the process proceeds to step 402 for normal flasher relay control; otherwise, the process proceeds to step 413 for lamp outage flasher relay control. Note that this flag is initially set to NO in step 301. Thus, when step 103 is first executed, the normal flasher relay control will be performed. In step 402, the flasher relay is turned on by setting FLASHER_RELAY_CONTROL to ON. Then, the process proceeds to step 403 to set the free-running decrement timer $T_d$ to $t_{normal}$ milliseconds (ms). The value for $t_{normal}$ is selected so that it is equal to half of the period for the normal relay flash rate. For example, if the normal flasher relay flash rate is 80 cycles per minute, the value for $t_{normal}$ is 375 milliseconds. Steps 404, 405 and 406 form a loop, in which the FLASHER CURRENT signal and the HAZARD SENSE signal are continuously checked until either the timer $T_d$ becomes 0 or the HAZARD SENSE signal becomes LOW or the FLASHER CURRENT becomes 0. When in step 404 the HAZARD SENSE signal is detected to be LOW, indicating the power to the flasher relay is removed, the process proceeds to step 424 to turn off the flasher relay by setting FLASHER_RELAY_CONTROL to OFF. Then, the process proceeds to step 104.

If the HAZARD SENSE signal is detected HIGH in step 404, but no flasher current is detected in step 405, indicating the flasher switch is turned off, the process proceeds to step 424 to turn off the flasher relay. If the FLASHER REQUEST is still active, i.e. the HAZARD SENSE signal is LOW and the FLASHER CURRENT is non-zero, the process proceeds to step 406 to check whether timer $T_d$ times out. If $T_d$ is not 0, the process proceeds back to step 404. When timer $T_d$ becomes 0 in step 406, the process proceeds to step 407 to check the lamp outage condition.

In the normal condition, the flasher current is close to the adaptive flasher current. If one or more bulbs are burned out, the flasher current will be much lower than the adaptive flasher current. In step 407, if the flasher current is detected to be lower than or equal to $k_0$.ADAPTIVE_FLASHER_CURRENT, a lamp outage condition is considered to exist. The constant $k_0$ is less than 1 and is selected so that it can detect the outage of one or more bulbs. In a four-bulb system for the left turn signal and for the right turn signal, for example, $k_0$ can be selected to be 0.85. The process then proceeds to step 408 to set the lamp outage flag LAMP_OUTAGE_STATUS to YES and set the flasher current learning flag CURRENT_LEARN_STATUS to NO. If the FLASHER CURRENT in step 407 is detected to be normal, the process proceeds to step 409 to check if the current learning is allowed. If the flasher current is higher than or equal to a predetermined value, HIGH_FLASHER_CURRENT_LIMIT, the process proceeds to step 411 to disallow the flasher current learning process. Step 409 is used mainly to inhibit the flasher learning process when the hazard switch is ON, in which case all the flasher lamps will be ON, causing twice the flasher current. For example, in an eight-bulb hazard lamp system, i.e., four bulbs each for the right turn signal and for the left turn signal, HIGH_FLASHER_CURRENT_LIMIT can be selected to be 1.25 times of the nominal flasher current, i.e. 1.25.NOMINAL_FLASHER_CURRENT.

In step 411, the LAMP_OUTAGE_STATUS is set to NO and the CURRENT_LEARN_STATUS is set to NO. If the flasher current is detected to be normal, the process proceeds to step 410, where the LAMP_OUTAGE_STATUS is set to NO and the CURRENT_LEARN_STATUS is set to YES. The process then proceeds to step 412 to turn off the flasher current by setting FLASHER_RELAY_CONTROL to OFF. In addition, the free-running decrement timer $T_d$ is set to $t_{normal}$ ms. Afterward, the process proceeds to step 421. Steps 421, 422 and 423 form a loop to check if the HAZARD SENSE signal becomes LOW or the FLASHER REQUEST signal becomes inactive while waiting for timer $T_d$ to time out. When the HAZARD SENSE signal is detected to be LOW, indicating the power to the flasher relay is removed, the process proceeds to step 104. Similarly, when the FLASHER REQUEST signal is detected to be inactive, the process proceeds to step 104. When $T_d$ becomes 0, a complete normal flash cycle is completed and the process proceeds back to step 401.

If the lamp outage flag LAMP_OUTAGE_STATUS is set to YES in step 408, then the process proceeds from step 401 to step 413. After the flasher relay is turned on by setting FLASHER_RELAY_CONTROL to ON in step 413, the process proceeds to step 414. The free-running decrement timer $T_d$ is set to $t_{outage}$ ms in step 414. The value for $t_{outage}$ is selected so that it is equal to half of the period for the lamp outage relay flash rate. For example, if the lamp outage flash rate is 120 cycles per minute, the value for $t_{outage}$ is 250 milliseconds. Similar to steps 404 to 406, steps 415, 416 and 417 form a loop, in which the FLASHER CURRENT signal and the HAZARD SENSE signal are continuously checked until either the timer $T_d$ becomes 0 or the HAZARD SENSE signal becomes LOW or the FLASHER CURRENT becomes 0. When in step 415, the HAZARD SENSE signal is detected to be LOW, indicating the power to the flasher relay is removed, the process proceeds to step 424 to turn off the flasher relay by setting FLASHER_RELAY_CONTROL to OFF.

Then, the process proceeds to step 104. If the HAZARD SENSE signal is detected HIGH in step 415 but no flasher current is detected in step 416, indicating the flasher switch is turned off, the process proceeds to step 424 to turn off the flasher relay. If the FLASHER REQUEST is still active, i.e. the HAZARD SENSE signal is LOW and the FLASHER CURRENT is non-zero, the process proceeds to step 417 to check whether timer $T_d$ times out. If $T_d$ is not 0, the process proceeds back to step 415. When timer $T_d$ becomes 0 in step 417, the process proceeds to step 418 to check if the lamp outage condition still exists. In step 418, if the FLASHER CURRENT is detected to be greater than or equal to $k_1$.ADAPTIVE_FLASHER_CURRENT, a normal condition is considered to exist. The constant $k_1$ is less than 1 and is selected so that it can determine if the flasher lamps are operating normally. In a four-bulb system for the left turn signal and for the right turn signal, for example, $k_1$ can be selected to be 0.9. The process then proceeds to step 419 to set the lamp outage flag LAMP_OUTAGE_STATUS to NO and set the flasher current learning flag CURRENT_LEARN_STATUS to NO. Otherwise, the LAMP_OUTAGE_STATUS flag is not changed. Then, the process proceeds to step 420 to turn off the flasher relay and set the free-running timer to $t_{outage}$ ms. The process then proceeds to step 421. As described before, steps 421, 422 and 423 form a loop to check if the HAZARD SENSE signal becomes LOW or the FLASHER REQUEST signal becomes inactive while waiting for timer $T_d$ to time out. When the HAZARD SENSE signal is detected to be LOW, indicating the power to the flasher relay is removed, the process proceeds to step 104. Similarly, when the FLASHER REQUEST signal is detected to be inactive, the process proceeds to step 104. When $T_d$ becomes 0, a complete lamp outage flash cycle is completed and the process proceeds back to step 401.

After the FLASHER REQUEST signal is detected inactive, the process proceeds to step 104 to check the LAMP_OUTAGE_STATUS. Referring to FIG. 2, if the LAMP_OUTAGE_STATUS is YES, the process proceeds to step 102; otherwise, the process proceeds to step 105 to check the flasher current learning flag. If the flasher current learning flag CURRENT_LEARN_STATUS is set to NO, the process proceeds to step 102; otherwise, the process proceeds to step 106 to update the adaptive flasher current ADAPTIVE_FLASHER_CURRENT and ADAPTIVE_FLASHER_CURRENT_NVM.

Referring to FIG. 6, in step 501, the flasher current is first checked against a predetermined constant, HIGH_ADAPTIVE_CURRENT_LIMIT. If the flasher current is greater than HIGH_ADAPTIVE_CURRENT_LIMIT, the ADAPTIVE_FLASHER_CURRENT is set equal to HIGH_ADAPTIVE_CURRENT_LIMIT in step 502; otherwise, the process proceeds to step 503, where the flasher current is checked against a predetermined constant, LOW_ADAPTIVE_CURRENT_LIMIT. If the flasher current is less than LOW_ADAPTIVE_CURRENT_LIMIT, the ADAPTIVE_FLASHER_CURRENT is set equal to LOW_ADAPTIVE_CURRENT_LIMIT in step 504; otherwise, the ADAPTIVE_FLASHER_CURRENT is set equal to the flasher current reading, FLASHER_CURRENT, in step 505. From step 505, the process proceeds to step 506 to compare the ADAPTIVE_FLASHER_CURRENT and ADAPTIVE_FLASHER_CURRENT_NVM. If the absolute difference value between these two is greater than a predetermined constant, $I_{diff}$, the process proceeds to step 507 to update the ADAPTIVE_FLASHER_CURRENT_NVM with the ADAPTIVE_FLASHER_CURRENT value. Then, the process proceeds to step 102. Note that when in step 502 or step 504 the process also proceeds to step 507. The predetermined constant, $I_{diff}$, is used to prevent the ADAPTIVE_FLASHER_CURRENT_NVM from being updated too frequently. On the other hand, the two predetermined constants, HIGH_ADAPTIVE_CURRENT_LIMIT and LOW_ADAPTIVE_CURRENT_LIMIT, determine the learning range for the adaptive flasher current, ADAPTIVE_FLASHER_CURRENT and ADAPTIVE_FLASHER_CURRENT_NVM. For example, if the learning range is selected to be within +/-10% of the nominal flasher current, then HIGH_ADAPTIVE_CURRENT_LIMIT can be set to 1.1.NOMINAL_FLASHER_CURRENT and LOW_ADAPTIVE_CURRENT_LIMIT can be set to 0.9.NOMINAL_FLASHER_CURRENT.

For different vehicles, the kind of flasher lamps and/or the number of flasher lamps may be different, the wiring resistance, and the connector resistance may also be different, and thus the nominal flasher current may be different. To make this control algorithm universal, the three reference constants, i.e. NOMINAL_FLASHER_CURRENT, HIGH_ADAPTIVE_CURRENT_LIMIT, and LOW_ADAPTIVE_CURRENT_LIMIT can be stored in the NVM. These constants are then programmed accordingly, based on the vehicle configuration, in the manufacturing process.

While the best mode for carrying out the invention has been described in detail, those familiar with the art to which this invention relates will recognize various alternative designs and embodiments for practicing the invention within the scope of the appended claims.

What is claimed is:

1. A method of controlling a flasher relay and detecting a lamp outage condition in a vehicle flasher system including a plurality of lamps, the method comprising:

a) initializing an adaptive flasher current variable when the vehicle flasher system is powered on;

b) monitoring the vehicle flasher system to detect a driver flasher signal request;

c) measuring the flasher current in the flasher system to determine whether a lamp outage condition exists and altering flasher relay on-off frequency if a driver flasher signal request is detected;

d) continuing step c) until the driver flasher request is removed;

e) updating the adaptive flasher current variable based upon the measured flasher current to compensate for system resistance changes over time for -accurate lamp outage detection;

f) returning to step b).

2. The method of claim 1, wherein said step of initializing an adaptive flasher current variable comprises:

reading a stored adaptive flasher current variable from a non-volatile memory location;

setting the adaptive flasher current variable equal to the stored adaptive flasher current variable if the stored adaptive flasher current variable falls within the predetermined valid nominal flasher current range; and setting the adaptive flasher current variable and the stored adaptive flasher current variable equal to a predetermined nominal value if the stored adaptive flasher current variable falls outside the predetermined valid nominal flasher current range.

3. The method of claim 1, wherein said step of monitoring the vehicle flasher system to detect a driver flasher signal request comprises:

providing a voltage divider in communication with a flasher switch; and monitoring the voltage across the voltage divider to detect a driver flasher signal request when a voltage drop is detected.

4. The method of claim 1, further comprising:

skipping step e) if a lamp outage condition is detected or if the measured flasher current is greater than a predetermined high flasher current.

5. The method of claim 1, wherein said step of updating the adaptive flasher current variable further comprises:

setting the adaptive flasher current variable equal to a predetermined upper limit of a nominal flasher current range if the measured current is greater than this upper limit;

setting the adaptive flasher current variable equal to a predetermined lower limit of the nominal flasher current range if the measured current is less than this lower limit;

setting the adaptive flasher current variable equal to the measured flasher current if the measured flasher current is within the upper limit and the lower limit of the nominal flasher current range; and setting a stored adaptive flasher current variable equal to the updated adaptive flasher current variable if the difference between the updated adaptive flasher current variable and the stored adaptive flasher current variable is greater than a predetermined value.

6. A flasher relay control and lamp outage detection system for an automotive vehicle with a plurality of turning lamps and a vehicle battery, the system comprising:

a) a hazard switch, b) a flasher switch electrically connected with the hazard switch and with the lamps, c) a flasher current signal circuitry electrically connected with the hazard switch, d) a flasher request signal circuitry electrically connected with the current signal circuitry, e) a flasher relay control driver circuitry electrically connected with the flasher request signal circuitry, f) a hazard sense signal circuitry selectively electrically connected with the flasher relay control driver circuitry, g) a flasher relay connected between said hazard sense signal circuitry and flasher relay control driver circuitry, and h) a microcontroller electrically connected with the flasher current signal circuitry, the flasher request signal circuitry, the hazard sense signal circuitry and the flasher relay control driver circuitry, wherein the microcontroller is operative to periodically update an adaptive flasher current variable in response to a measured flasher current from the flasher current signal circuitry for adapting the system in response to resistance changes over time for lamp outage detection.

7. The flasher system of claim 6, wherein said flasher request signal circuitry comprises a voltage divider consisting of three resistors.

8. The flasher system of claim 6, wherein said flasher current signal circuitry comprises a current amplifier consisting of one operational amplifier and five resistors.

9. The flasher system of claim 6, wherein said hazard sense signal circuitry comprises a voltage divider consisting of two resistors.

10. A method of detecting a lamp outage condition in a vehicle flasher system including a plurality of lamps, the method comprising:

a) reading a stored adaptive flasher current variable from a non-volatile memory location;

b) setting an adaptive flasher current variable equal to the stored adaptive flasher current variable if the stored adaptive flasher current variable falls within a predetermined learning range;

c) setting the adaptive flasher current variable equal to a predetermined nominal value if the stored adaptive flasher current variable falls outside the predetermined learning range;

d) monitoring the vehicle flasher system to detect a driver flasher signal request;

e) measuring current output from the plurality of lamps in the vehicle flasher system;

f) determining whether the level of measured current is indicative of a lamp outage condition by comparing the measured current to the adaptive flasher current variable;

g) setting the adaptive flasher current variable equal to the measured current if the measured current falls within the predetermined learning range, thereby compensating for resistance changes in the flasher system over time to allow lamp outage detection; and f) returning to step d).

* * * * *